United States Patent [19]

Pitts, Jr.

[11] 4,212,530
[45] Jul. 15, 1980

[54] MEANS AND METHOD FOR PRINTING ON LIGHT SENSITIVE MATERIAL

[75] Inventor: Robert W. Pitts, Jr., Houston, Tex.

[73] Assignee: Texaco Inc., White Plains, N.Y.

[21] Appl. No.: 967,187

[22] Filed: Dec. 7, 1978

[51] Int. Cl.$^2$ .................... G03G 15/00; G03B 27/32
[52] U.S. Cl. ................................. 355/14 R; 346/160;
355/14 E; 355/68; 355/77
[58] Field of Search ............... 355/3 R, 14, 68, 77, 355/14 R, 14 E; 346/160

[56] References Cited

U.S. PATENT DOCUMENTS

| 4,046,471 | 9/1977 | Branham et al. ............... 355/3 R X |
| 4,093,955 | 6/1978 | Brown et al. .................... 355/3 R X |
| 4,144,539 | 3/1979 | Davie et al. ..................... 355/14 X |
| 4,149,798 | 4/1979 | McGowan et al. ............. 355/3 R X |

Primary Examiner—Fred L. Braun
Attorney, Agent, or Firm—Carl G. Ries; Robert A. Kulason; Ronald G. Gillespie

[57] ABSTRACT

High speed printing apparatus for printing on light sensitive material includes a circuit adapted to receive at least one input signal which provides a control signal in accordance with a received input signal. A laser scans the material and provides pulses of light which strike the material in accordance with the control signal so as to expose the light sensitive material at the point of striking. The exposed film is developed so as to provide a printed copy in accordance with the received input signal.

4 Claims, 3 Drawing Figures

MEANS AND METHOD FOR PRINTING ON LIGHT SENSITIVE MATERIAL

BACKGROUND OF THE INVENTION

Field of the Invention

The present invention relates to printing apparatus in general and, more particularly, to printing on light sensitive material.

SUMMARY OF THE INVENTION

A high speed printer which prints on light sensitive material includes a circuit adapted to receive at least one input signal and which provides a control signal in accordance with a received input signal. A laser scans the light sensitive material and provides pulses of light which strike the material thereby exposing it in accordance with the control signal. The light sensitive material is developed so as to provide a printed copy in accordance with the received input signal.

The objects and advantages of the invention will appear more fully hereinafter from a consideration of the detailed description which follows, taken together with the accompanying drawings which follow, wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
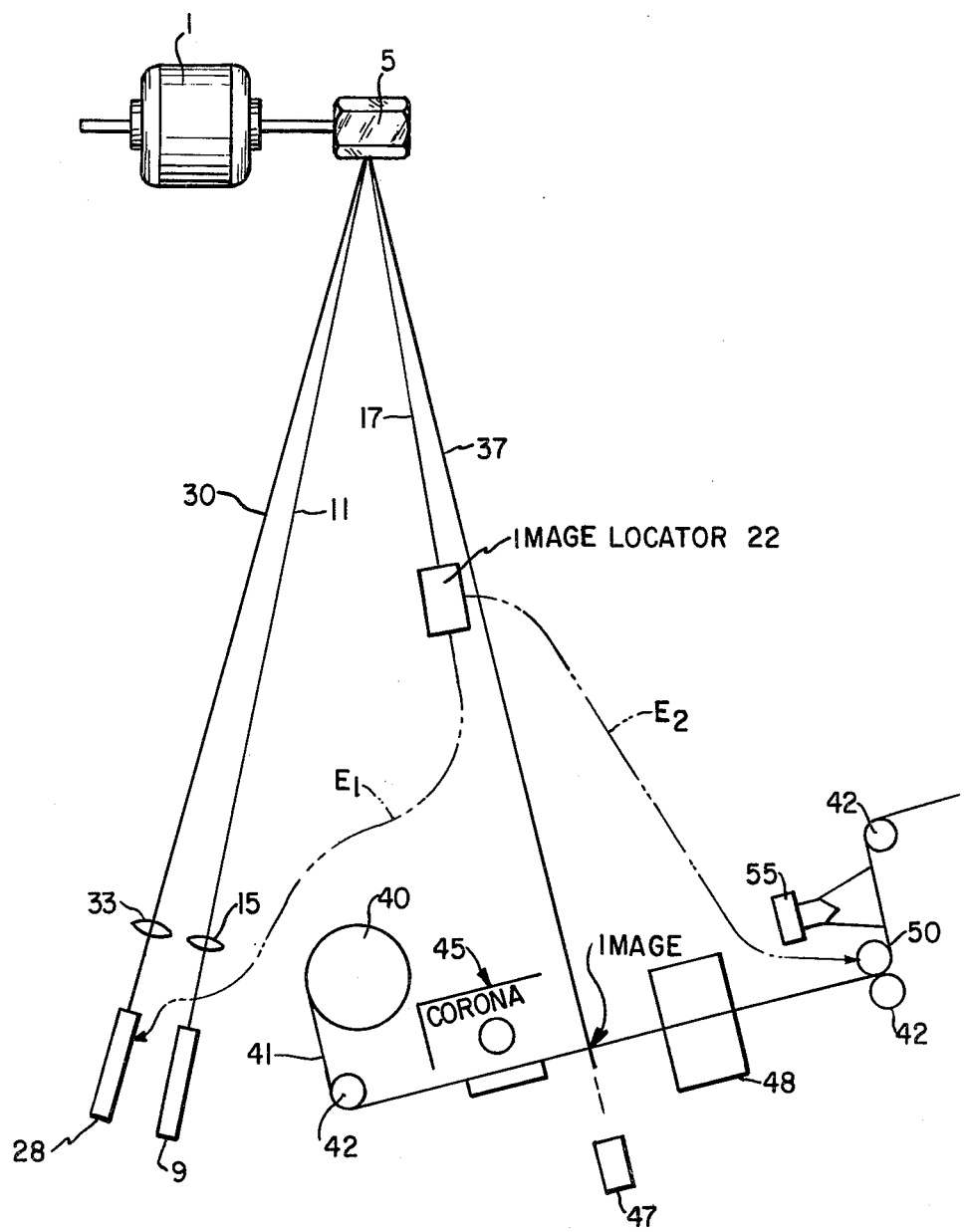
FIG. 1 is a graphical representation of a printer, constructed in accordance with the present invention.

Referring to FIG. 1, a motor 1, when energized, rotates an eight sided precision mirror 5 at a predetermined rate. A conventional type $H_eN_e$ laser 9 emits a continuous light beam 11 which passes through a lens element 15 to focus on point in a plane of the mirror 5 which reflects beam 5 in a manner so that a reflection beam 17 will scan the surface of image sensor array means 20 (not shown in FIG. 1) of an image locator 22. Laser 9 may also be a HeCd or a HeSe laser.

Image locator 22, as hereinafter explained, controls the pulsing of another $H_eN_e$ laser 28 with a pulse signal $E_1$. When pulsed, laser 28 provides a pulse of light 30, which passes through a lens 33 to strike the surface of mirror 5 at the same point as beam 11 strikes mirror 5. Mirror 5 reflects light pulses 30 as light pulses 37.

It should be noted that the operation of elements 40 through 55 are of conventional nature. A supply 40 of transparent electrophotographic film 41 is provided. Film 41 moves past a roller 42 where the film is charged by a corona 45. Prior to charging, film 41 is insensitive to light, after charging film 41 is sensitive to light. Light pulses 37 pass through film 41 and is displayed by display means 47. Light pulses 37 expose film 41 which continues through developer 48, past advance roller 50 controlled by drive pulses $E_2$ and a roller 42, where it is fixed by a radiant energy source 55, such as Xenon flash or a continuous infrared source. The developed and fixed film may then be further processed as desired, that is stored in rolls or cut into sheets.

Figure 2:
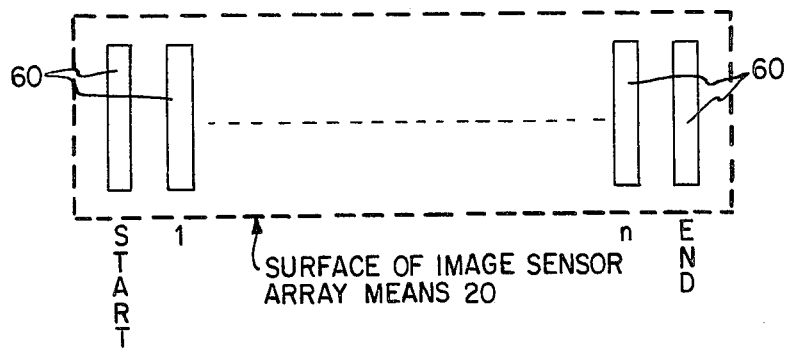
FIG. 2 is a graphical representation of the surface of the image sensor array means of the image locator shown in FIG. 1.

Referring now to FIG. 2, image sensor array means 20 includes a plurality of image sensors 60. Image array means 20 may be similar to the linear image sensors manufactured by Fairchild Semiconductor Company as their part number CCD131. It should be noted that part CCD131 contains 1024 sensing elements 60. For purpose of discussion, the number of sensor elements 60 will be 1024, although there is no limit to the actual number of sensor elements 60.

Figure 3:
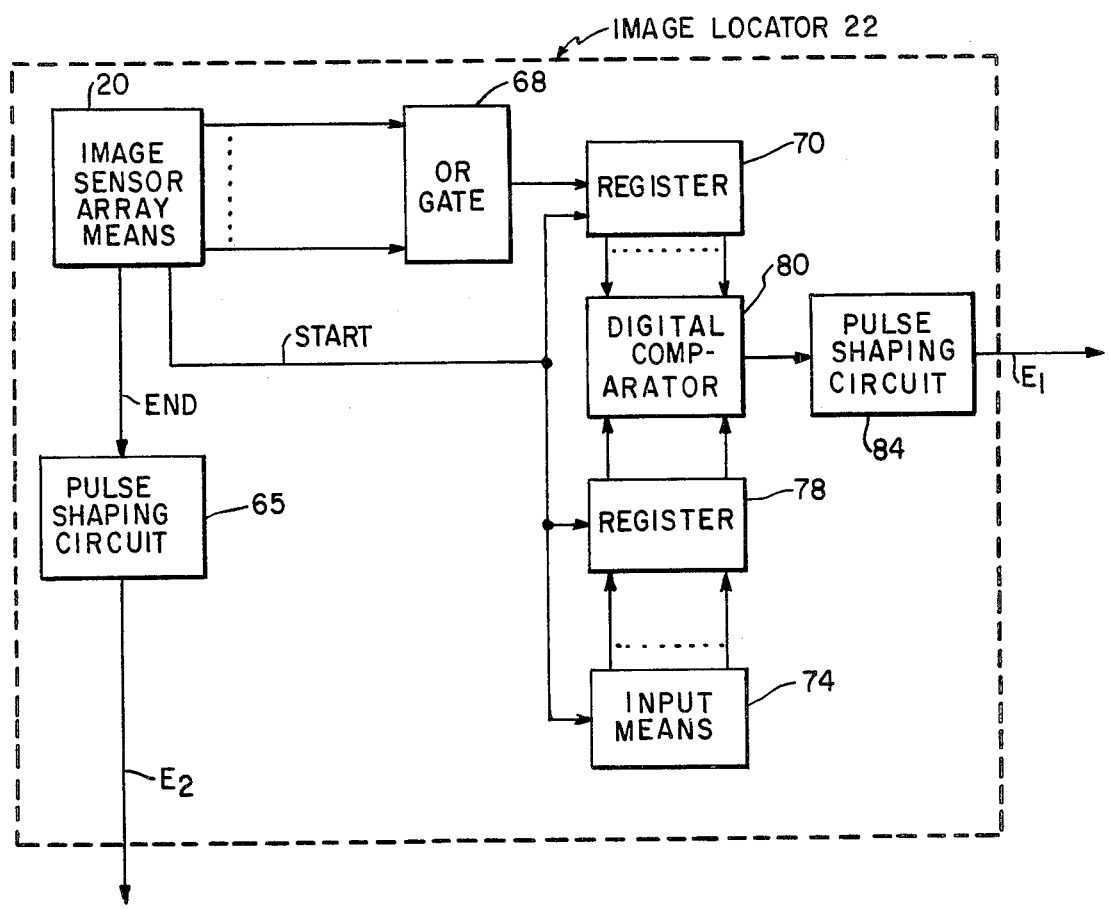
FIG. 3 is a simplified block diagram of the image locator shown in FIG. 1.

Referring also to FIG. 3, due to the rotation of mirror 5, beam 17 will move across sensing elements 60 in a manner so that it will strike a first image sensor 60, labeled "start" and continue on illuminating the other image sensors 60 one at a time in sequence at a rate governed by the rotational speed of mirror 5. When beam 17 passes image sensor 60 labeled "end", the next side of mirror 5 causes beam 17 to scan image sensor array means 20 again. Thus a complete revolution of mirror 5 causes beam 17 to scan image sensor array means 20 eight times.

When beam 17 illuminates the "end" image sensor 60, sensor 60 provides a pulse to a pulse shaping circuit 65 which provides a drive pulse $E_2$ to cause drive roller 50 to advance the film by a predetermined amount. The outputs of image sensors 60, with the exception of the "start" and "end" image sensors 60, are applied to an OR gate 68. It would be obvious to one skilled in the art that OR gate 68 represents a plurality of OR gates connected to operate as a single OR gate. OR gate 68 in effect provides clock pulses which are serially entered into a register 70.

Input means 74, which may be a microprocessor, the outputs from a digital computer or even a digital tape with decoding means to set up desired digital signals, provides a high logic level signal when the film is to be exposed and a low level signal when the film is not to be exposed at that point. The digital signals from input means 74 are applied to a register 78. The "start" signal $E_2$ from image sensor array means 20 is applied to input means 74 and to registers 70 and 78. The leading edge of the "start" signal causes register 78 to enter the input signals from input means 74. The trailing edge of "start" signal $E_2$ causes input means 74 to prepare the next set of signals. Register 70 is reset by the "start" signal. Register 78 provides its signals to a digital comparator 80 which also receives digital signals from register 70.

In operation, at each clock pulse from OR gate enters register 70, digital comparator 80 in effect compares the position of register 70 with the corresponding position of register 78 to be determined if an image is required to be printed. If at a position, registers 70, 78 provide high logic level signals to comparator 80 which in turn provides an output to a pulse shaped circuit 84. Circuit 84 provides pulse $E_1$ pulsing laser 28 causing it to print the image hereinbefore described.

Upon the end of the scan, pulse $E_2$ causes the film to be advanced for the next scan cycle.

A printing device of the type hereinbefore described represents a significant improvement as to printing speed and to transmission of the printing. The resultant image may be stored on electrophotographic film in the form of dots which will present an image with precision of the etched image locator and with the revolution desired, i.e. the number of photo-sites per inch. The maximum speed of the device depends on the response of each component, however, the image locator, the comparator and the data registers could operate at a $12 \times 10^6$ hertz rate. Should the input means be a microprocessor, the microprocessors now on the market can operation a $1 \times 10^6$ hertz rate. Hard-wired circuits could eliminate the microprocessor and the device could operate at 5000 lines per second using a trace resolution of 2,000 points/line. This could result in a printing rate of 2 types pages per second.

What is claimed is:

1. High speed printing apparatus for printing on light sensitive material comprising control signal means adapted to receive at least one input signal for providing a control signal in accordance with the received input signal; laser means for scanning the material and providing pulses of light which strike the material, in accordance with the control signal, to expose the material, said laser means includes a continuous laser emitting a beam of light and a pulse laser responsive to the control signal to provide the light pulses; a mirror, having a plurality of reflective surfaces, spatially related to the two lasers, to the control signal means and to the material so that the light from both lasers strike substantially the same point on a surface of the mirror; means connected to the mirror for rotating the mirror at a predetermined rate so that in effect the pulse laser repeatedly scans the material in one direction while the light beam from the continuous laser is reflected by the mirror to repeatedly scan the control signal means in a manner so that the reflected light beam scan corresponds to the scan of the material by the pulse laser; means connected to the control signal means for moving the material a predetermined distance after each scan so that unexposed material is available for exposure; and means for developing the material so as to provide a printed copy in accordance with the received input signal.

2. Apparatus as described in claim 1 in which the control signal means include a plurality of image sensor means for being scanned by the reflected beam of light, each sensor means providing an electrical pulse when the reflected beam of light passes over it, and circuit means adapted to receive input signals and connected to all the image sensor means for providing the control signal in accordance with the pulses from the image sensor means and a received input signal.

3. Apparatus as described in claim 2 in which the plurality of image sensor means includes a first image sensor means which is the first image sensor means to receive the beam of light during each scan, and a last image sensor means which is the last image sensor means to receive the beam of light during each scan and which provides pulses to the moving means causing the moving means to move the material; and the circuit means includes an OR gate, connected to the plurality of image sensor means except for the first and last image sensor means, which provides the pulses from the image sensor means as clock pulses, a first register means adapted to receive the input signal connected to the first image sensor means and responsive to the pulses therefrom for entering a received input signal in response to the pulse from the first image sensor means and providing signals thereto, second register means connected to the OR gate for entering the clock pulses from the OR gate and providing corresponding signals, and comparator means connected to the pulse laser and to both register means for providing the control signal to the pulse laser in accordance with the comparison of the signals from both register means.

4. A method for high speed printing on light sensitive material comprises the steps of receiving at least one input signal, providing a light beam with a first laser, controlling a second laser in accordance with a control signal to provide pulses of light, rotating a multi-surface mirror at a predetermined rate in a predetermined direction, arranging the first and second lasers and the mirror with the material and an image locator so that light emitted by both lasers strike a surface of the rotating mirror at the same point with the pulses of light being reflected by the rotating mirror impinging on the material to expose the material as the second laser repeatedly scans the material while the reflected light beam repeatedly scans the image locator, providing the control signal in accordance with the received input signal and the scanning of the image locator by the reflected light beam, moving the material a predetermined distance after each scan by the second laser so that unexposed material is available for exposure, and developing the exposed material so as to provide a printed copy in accordance with the receiving input signal.

* * * * *